United States Patent [19]
Kondo et al.

[11] 3,910,799
[45] Oct. 7, 1975

[54] LEAD-ACID STORAGE BATTERY HAVING IMPROVED SEPARATORS

[75] Inventors: Ko Kondo, Takatsuki; Takashi Ito, Toyonaka; Koichiro Ohtomo, Takatsuki, all of Japan

[73] Assignees: Kanebo, Ltd.; Ko Kondo, both of Tokyo, Japan; part interest to each

[22] Filed: Feb. 11, 1974

[21] Appl. No.: 441,271

[52] U.S. Cl. .................................. 136/145; 136/26
[51] Int. Cl. ............................................. H01m 3/02
[58] Field of Search ........ 136/145, 146, 143, 26–27; 210/505

[56] References Cited
UNITED STATES PATENTS

| | | | |
|---|---|---|---|
| 2,478,186 | 8/1949 | Gerber | 136/145 |
| 2,511,887 | 6/1950 | Vinal | 136/145 |
| 2,543,137 | 2/1951 | Uber | 136/145 |
| 2,653,986 | 9/1953 | Philipps | 136/145 |
| 2,713,078 | 7/1955 | LeGros et al. | 136/146 X |
| 2,734,095 | 2/1956 | Mears et al. | 136/145 |
| 2,810,775 | 10/1957 | Raphael et al. | 136/145 |
| 2,880,260 | 3/1959 | Strauss | 136/143 |
| 3,092,509 | 6/1963 | Booth et al. | 136/145 X |
| 3,159,507 | 12/1964 | Abbe et al. | 136/145 |
| 3,779,958 | 12/1973 | Ohba | 136/146 X |

Primary Examiner—Anthony Skapars
Attorney, Agent, or Firm—Paul & Paul

[57] ABSTRACT

A lead-acid storage battery of improved capacity and prolonged life span is provided. The battery has separators characterized in that at least part of each separator, adhering closely to the surface of a positive plate, is composed of a flexible sheet provided with a plurality of microporous openings of a size sufficiently small to prevent finely divided particles of the anode active material from passing therethrough. Said separator is preferably made from phenolformaldehyde resin fibers or a blend thereof.

17 Claims, 3 Drawing Figures

1 2 3 4

4 6 1 2 4

LEAD-ACID STORAGE BATTERY HAVING IMPROVED SEPARATORS

The present invention relates to a paste-type lead-acid storage battery having specified separators placed between the alternate positive and negative plates in the cells thereof. It also relates to a process of manufacturing such separators.

A paste-type lead-acid storage battery has anode active materials composed mainly of $PbO_2$ adhering close to both surfaces of the positive plate, which active materials are in the form of finely divided particles bonded with each other and prepared by coating a base plate of hard lead with a paste of finely divided powder of $Pb_3O_4$ or PbO, kneaded with sulfuric acid, and then subjecting the coated paste to formation thereby to oxidize the substantial part of the $Pb_3O_4$ or PbO, to $PbO_2$. Porous separators placed between the alternate positive and negative plates in the cells of such a paste-type lead-acid storage battery should preferably perform the following functions.

1. The separators must permit free electrolytic conduction by ionic flow therethrough so that the internal electrical resistance of the storage battery is as low as possible.

2. The separators must have a plurality of microporous openings of a size sufficiently small to prevent particles of the anode active material from depositing in such openings and the deposits from growing through the separator to cause a short circuit between adjacent plates.

3. The separators must prevent the anode active material from coming off or dislodging from the positive plate. Although the active material exists on the anode in the form of $PbO_2$ when charging is completed, it is gradually converted to $PbSO_4$ during discharge. This conversion is accompanied by cubic expansion of the particles of active material. That is, the particles will have expanded in volume approximately 1.9 times at the completion of discharging as compared with their volume at the completion of charging. During charging, the expanded particles contract. Due to the repeated expansion and contraction, the bonding force between the particles becomes weak, the active material becomes soft and finally comes off of the positive plate. This leads to reduction in capacity of the battery, and results in short-circuiting between adjacent plates as mentioned hereinbefore.

4. The separators should have a structure such that the electrolytic solution, i.e. sulfuric acid, is capable of readily permeating the separators and being well retained within the separators.

5. The separators should be resistant to acid and oxidation.

6. The separators should have a mechanical strength sufficiently high to withstand shock or other external forces imposed thereon during construction and subsequent use of the battery.

Many porous separators have been proposed. However, no separators are known which perform all the functions mentioned above. For example, in the case of separators made by treating a sheet of cellulose pulp with a thermosetting resin such as a phenolformaldehyde resin, the internal electrical resistance of the storage battery is high and particles of the anode active material tend to pass through, hence depositing in the porous separators and the active material tends to come off of the positive plate, although the separators are superior in permeation and diffusion of the electrolytic solution. In the case of separators of a rubber sheet having microporous openings, and separators made sintering finely divided vinyl chloride polymer, these separators usually have 0.3 to 0.5 mm thickness and the internal electrical resistance of the battery is high and the anode active material tends to come off of the positive plate, although these separators are resistant to acid and oxidation and prevents particles of the anode active material from depositing in the microporous openings. Further, in all known separators, it is very difficult or costly to provide therein microporous openings of a substantially uniform size.

It has also been proposed, mainly in order to improve retention of the electrolytic solution, that a mat of glass fibers, with individual fibers being entangled to some extent with each other, be placed as a spacer between the positive plate and the known separator such as a resin-impregnated cellulose pulp plate or a thin wood plate. However, such a space prevents only to a slight extent the anode active material from coming off or dislodging from the positive plate. This is because the surfaces of a glass fiber mat are too rough and irregular and only a part of the active material can be pressed against the positive plate by the glass fibers.

Therefore, it is an object of the present invention to provide a paste-type lead-acid storage battery, which is provided with separators performing substantially all of the functions listed above, and accordingly, has improved capacity and output and a prolonged life span.

In accordance with the present invention, there is provided a paste-type lead-acid storage battery having porous separators each placed between the alternate positive and negative plates in the cells thereof, characterized in that at least part of each separator, adhering closely to the surface of the positive plate, is composed of a sheet of an acid and oxidation resistant, flexible material, said sheet being provided with a plurality of microporous openings of a size sufficiently small to prevent finely divided particles of the anode active material from passing therethrough. This storage battery has improved capacity and prolonged life span, and is useful particularly for a battery powered car.

For a detailed description of the invention, reference is made to the accompanying drawings and the following specification.

Figure 1:
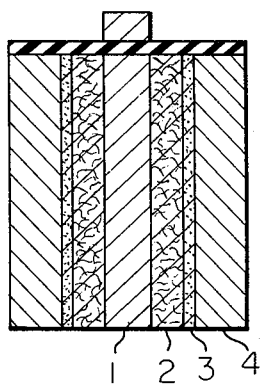
FIG. 1 is a cross-sectional view of a unit cell of a known battery.

The unit cell shown in FIG. 1 is already known mainly in order to improve retention of the electrolytic solution. The unit cell has a structure such that a mat of glass fibers 2 is placed as a spacer between the positive plate 1 and a separator 3 such as a resin-impregnated cellulose pulp sheet or a sintered polyvinyl chloride sheet. Reference numeral 4 indicates the negative plate. Such a unit cell has defects as hereinbefore described.

Figure 2:
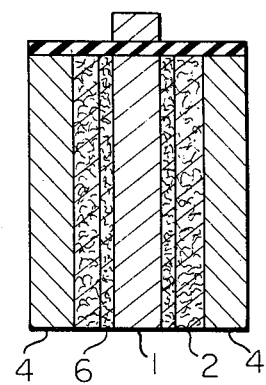
FIG. 2 is a cross-sectional view of a unit cell of a battery of the invention.
Figure 3:
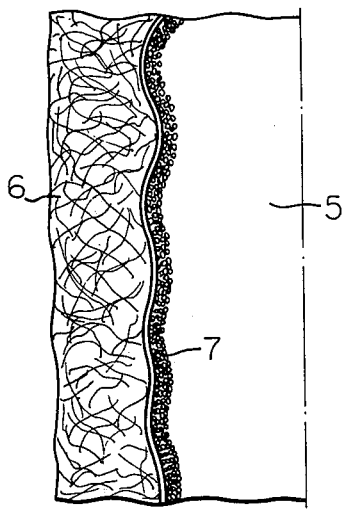
FIG. 3 is an enlarged cross-sectional view of the boundary region between the positive plate and the separator.

The unit cell shown in FIG. 2 has a structure such that a separator assembly comprising a mat of glass fibers 2 and a sheet 6 provided with a plurality of microporous openings of exceptionally small size, is placed between the positive plate 1 and the negative plate 4. The sheet 6 is positioned in a manner such that it adheres closely to the surface of the positive plate 1. The sheet 6 should be composed of a material which is electrically insulative, resistant to electrolytic solution, as well as to nascent oxygen generated on the positive plate during charge. The sheet 6 should be provided with a plurality of microporous openings of a size sufficiently small to prevent finely divided particles 7 of the anode active material 5 (shown in FIG. 3 as an enlarged microphotographic view), and sufficiently flexible to adhere closely to the surface of the active material layer 5 on the positive plate 1.

The unit cell shown in FIG. 2 is prepared by compressing superposed layers of the sheet 6 and the glass fiber mat 2 with the positive plate 1 and the negative plate 4. The entire surface of the active material 5 is pressed by the flexible sheet 6 and therefore, change in volume of the active material 5 at discharge and charge is minimized, and finely divided particles 7 of the active material 5 do not come off or dislodge from the positive plate. Although the flexible sheet 6 has a plurality of microporous openings, these microporous openings are of exceptionally small magnitude to prevent particles of the active material from depositing therein, which deposits can grow through the sheet to cause a short circuit between adjacent positive and negative plates.

The glass fiber mat 2 is effective mainly for holding the electrolytic solution therein. However, the glass fiber mat 2 may be omitted because it is possible to make the flexible sheet 6 comparably retentive. This embodiment is not shown in the accompanying drawings.

It is also possible to place a known separator plate (not shown in FIG. 2) such as a resin-impregnated cellulose pulp plate or a sintered polyvinyl chloride plate, between the flexible sheet 6 and the negative plate 4 in the case of the glass fiber mat 2 being omitted, or between the glass fiber mat 2 and the negative plate 4 in the case of the glass fiber mat 2 being employed.

The flexible sheet is in the form of fabric densely woven from acid and oxidation resistant type synthetic polymer fibers such as, for example, acrylonitrile polymer fibers, vinyl chloride polymer fibers, olefin polymer fibers, vinylidene chloride polymer fibers, polyester fibers, polyether fibers and phenolformaldehyde resin fibers; or glass fibers. It also may be in the form of non-woven fabric, paper or felt prepared from acid and oxidation resistant type synthetic polymer fibers such as listed above. Among acid and oxidation resistant type synthetic polymers fibers, preferable iis a phenolformaldehyde resin fiber of a fineness less than is 0.5 denier, i.e. approximately 5 micron diameter. The phenolformaldehyde resin fiber is in general prepared by the following procedure. A novolak type phenolformaldehyde resin is melt-extruded through an orifice into a non-oxidizing atmosphere while non-oxidizing gas is blown against the extruded filaments which are not yet coagulated, i.e. immediately after the extrusion from the orifice. The filaments, not yet coagulated, are torn off by the blown gas and are formed into exceptionally fine fibers. These fibers are then subjected to curing to effect crosslinking in the polymer molecule. Curing may be performed, for example, by treating the fibers with a crosslinking agent such as formaldehyde at a temperature of 60° to 105°C for 1 to 20 hours, in the presence of an acid catalyst such as sulfuric acid and hydrochloric acid. The weight of the cured fibers is increased by approximately 3 to 30 percent, based on the weight of the fibers not yet cured. The increase in percent by weight is hereinafter referred to as "degree of hardening". The degree of hardening is used for measurement of the thermosetting property. The fibers so prepared are popularly called "blown fibers" and are commercially available, for example, in the name of Kynol (trade name).

The phenolformaldehyde resin fibers may be used for the manufacture of the separator plate as they are, but optimum results are obtainable from fibers prepared by further treating the phenolformaldehyde resin fibers such that at least part of the phenolic hydroxyl groups of the resin is capped. This capping may be performed by esterification of the hydroxyl group by treatment with acid anhydrides such as acetic acid anhydride and terephthalic acid anhydride or with acid halides such as isophthalyl dichloride and terephthalyl dichloride, or etherification of the hydroxyl group by treating with alkylating agents such as dimethyl sulfate, methyl bromide and ethyl bromide or with an epoxy group-containing compounds such as epichlorohydrin and diglycidylbisphenol-A.

It is preferable that at least 60 percent, more preferably at least 70 percent and most preferably 80 percent, by mole, of the phenolic hydroxyl groups is capped. The higher the degree of capping, the more resistant to oxidation and acid is the resulting separator.

The acid and oxidation resistant type synthetic polymer fibers, including the phenolformaldehyde resin fiber, may be used alone or in combination with each other for the manufacture of the separator plate.

Among the forms of the separator plate, a sheet prepared by a procedure similar to a conventional wet-type papermaking procedure is preferred.

A preferable sheet is prepared from fibers having an exceptionally fine diameter, usually less than 5 microns and more preferably 3 microns or from a combination of such fine fibers with fibers of a relatively large diameter. In other words, when at least part of the fibers employed is fine, the resulting sheet has microporous openings of the desired size.

Such fine fibers may be produced by the following procedure. For example, a composite filament of two or more kinds of acid and oxidation resistant type synthetic polymers is treated with a liquid which is capable of dissolving at least one component of the composite filament but incapable of dissolving the other component. Thus, fine filaments of the latter component are obtainable. Or, a composite filament of two or more kinds of polymers, which are neither compatible with nor adherent to each other, is subjected to false-twisting thereby separating the two or more polymer components from each other. However, phenolformaldehyde resin fibers prepared by the procedure as mentioned hereinbefore is most preferable because these usually have exceptional fineness, e.g. an average of approximately 1 micron or less.

Some preferred embodiments of the preparation of the sheet used as a separator will be illustrated in detail.

In one embodiment, phenolformaldehyde resin fibers mentioned above or a blend of the phenolformaldehyde resin fibers with other acid and oxidation resistant type synthetic polymer fibers such as acrylonitrile polymer fibers, vinyl chloride polymer fibers, polyester fibers and polyolefin fibers; glass fibers or asbesto fibers are put into water. If desired, dispersing agents such as nonionic surface active agents and binders such as sap of hibiscus root may be incorporated thereinto. Then, a uniform aqueous dispersion of the fibers is prepared, for example, by beating. The aqueous dispersion is formed into a wet sheet by conventional papermaking machines such as, a Fourdrinier machine or a Yankee machine. Then, the wet sheet is dried and, if desired, pressed at a high temperature. The sheet, so prepared, usually has a thickness of 0.1 to 0.4 mm and a porosity of 60 to 80 percent by volume. Such a sheet is capable of being used as a battery separator as it is. However, the sheet may be impregnated with a solution or emulsion of an acid and oxidation resistant type synthetic polymer resin.

If blown fibers from phenolformaldehyde resin are used as a blend with other acid and oxidation resistant type fibers the blend should preferably contain at least 5 percent by weight, more preferably at least 50 percent by weight of the phenolformaldehyde. When the amount of the blown fibers is less than 5 percent by weight, the resulting separator generally has no microporous openings of exceptionally small magnitude and no porosity of desirably increased extent.

The acid and oxidation resistant type fibers should preferably have a length of 0.2 to 3 cm, more preferably 0.5 to 1.5 cm and a diameter of less than 25 microns, more preferably 5 to 10 microns. When the length is less than 0.2 cm, the separator is poor in mechanical strength. In contrast, when the length exceeds 3 cm, it is difficult to uniformly blend with the blown fibers.

Various binder resins of an acid resistant type may be present in an aqueous dispersion of the fibers. The binder resin includes, for example, resol resin, urea resin, petroleum resin, and acrylic resin. The amount of the binder resin is such that the amount deposited in the resultant sheet is less than 20 percent based on the weight of the fibers. When the amount is 20 percent by weight or more, the separators produced have microporous openings, of a size such that particles of the anode active material are deposited therein and the microporous openings are partially clogged with the binder resin particles. This partial obstruction leads to increase in the internal electrical resistance and prevention of the electrolyte solution from permeating the separator.

The sheet prepared by a wet-type papermaking process may be impregnated with a solution or dispersion of an acid and oxidation resistant type polymer resin such as acrylonitrile polymer, vinyl chloride polymer, polyester and olefin polymer, or rubbers. The amount of polymer resin is 3 to 25 percent by weight, preferably 5 to 15 percent by weight, based on the weight of the sheet. When the amount of the polymer resin exceeds the upper limit, microporous openings of the sheet are partly clogged with the polymer resin particles, as mentioned above with reference to the binder resin. The impregnation is performed by coating or immersing the sheet with a solution or dispersion such as an emulsion of the polymer resin. Any liquid can be utilized as solvent or dispersing medium provided that the liquid is capable of dissolving or dispersing the polymer resin therein but incapable of dissolving acid and oxidation resistant type fibers making up the sheet. The resin-impregnated sheet may be treated with curing agents or heated to effect cross-linking.

Both the resin impregnated sheet and the resin non-impregnated sheet may be pressed at a high temperature. Determination of pressure and temperature depend upon the particular acid and oxidation resistant type fibers used. Usually, a suitable pressure is 30 to 200 kg/cm$^2$ and a suitable temperature is 70° to 180°C. When a sheet is heat-pressed, polymer resin impregnated in the sheet or resin binder contained therein or a thermoplastic polymer fiber making up the sheet is at least partially fused and produces a sheet of improved mechanical strength.

In another preparation of a preferred embodiment of the sheet used as a battery separator, acid and oxidation resistant type fibers having an exceptionally fine diameter as mentioned hereinbefore are at least partially embedded in a fibrous structure such as woven or knitted or non-woven fabric of acid resistant type fibers.

The embedding of fine fibers in the fibrous structure may be performed as follows. For example, an aqueous dispersion of acid and oxidation resistant type fibers are formed into a wet sheet on the fibrous structure placed on the wire net of a papermaking machine; and during or immediately after the wet sheet formation, suction is applied from inside the wire net to the wet sheet whereby fine fibers making up the sheet are embedded in the fibrous structure.

Alternatively, fine fibers floated in the air are sucked into the fibrous structure, preferably in the form of a bag filter, by applying a suction thereto, or blown against the fibrous structure by compressed air.

The fine fibers to be embedded in the fibrous structure should have a length of less than 1.0 cm, more preferably 0.01 to 0.5 cm and a diameter of less than 5 microns, more preferably less than 3 microns, in order to produce a sheet having desired porosity and microporous openings of desired small size.

Acid resistant type fibers making up the fibrous structure, in which fine fibers are to be embedded, include acid and oxidation resistant type fibers mentioned hereinbefore and polyurethane fibers and cellulose fibers.

The resultant sheet has a structure such that at least part of the length of each fine fiber is embedded in the texture of the fibrous structure. In the manufacture of such a sheet, binder polymer resin may be employed and heat-press may be applied as mentioned in the preceding embodiment. Desired porosity and microporous openings of desired small size can be easily obtained by varying the suction force or the pressure of the compressed air, or METSUKE (basis weight) of the fibrous structure.

In order that the invention may be more fully understood, the following examples are given by way of illustration only. In the examples, parts and percentages are by weight unless otherwise specified.

The characteristics of the sheet to be used as a battery separator are determined as follows. Electrical resistance is determined in sulfurous acid with a specific gravity (at 25°C) of 1.280 by measuring the voltage drop of the specimen sheet. Permeability is determined by placing an aqueous dispersion of finely divided PbO$_2$ particles on the specimen sheet and applying suction to the sheet by an aspirator. Oxidation resistance is expressed in terms of the time period required for the voltage between the electrodes to drop to a stated voltage when an electric current is continuously applied at a current density of 70 mA/cm$^2$ through the separator specimen placed between the softened positive plate and the negative plate and in sulfuric acid having a specific gravity of 1.280 (at 25°C). Tensile strength is determined in accordance with Japanese Industrial Standard C-2313.

EXAMPLE 1

A novolak resin having a molecular weight of 900, prepared by condensing phenol with formladehyde in the presence of hydrochloric acid, was extruded by a melt extruder through an orifice into an atmosphere of nitrogen while nitrogen gas was blown against the stream of molten resin immediately after extrusion from the orifice. Fibers so prepared were of 0.5 to 1.0 micron in average diameter. The fibers were immersed in a bath of 170 ml of 35 percent hydrochloric acid and 150 ml of a 30 percent aqueous formladehyde solution at room temperature. Then, the bath was gradually heated to a temperature of 95°C over a period of 5 hours and maintained at that temperature for 3 hours to effect curing. The degree of hardening was 12 percent.

The cured fibers were immersed in a mixture of 350 g of dimethylformamide, 150 g of acetic acid anhydride and 25 g of p-toluenesulfonic acid at a temperature of 125°C for the time periods as shown in Table I to convert the phenolic hydroxyl group to an acetyl group. The degree of acetylation is shown as degree of capping in Table I, as measured by infrared spectrophotometry.

50 g of the acetylated fibers were put into 2000 ml of an aqueous solution of 0.5 percent resol phenolformaldehyde resin, followed by agitation to prepare a uniform dispersion. A sheet-like product was prepared by a conventional papermaking machine from the dispersion. The product was pressed at a temperature of 80°C and a pressure of 50 kg/cm² for 2 minutes to be formed into a sheet of 0.15 mm thickness.

A lead-acid storage battery having a capacity of 4 A.hr. at 10 hours' rate was constructed in a manner such that the sheet mentioned above was placed closely adherent to the positive plate and a glass fiber mat of 0.5 mm thickness was placed between the above sheet and the negative plate. The capacity of the battery was determined before and after 200, 400 and 600 times' repeated discharge and charge. Results are shown in Table I.

For comparison purpose, the test was repeated on a battery having commercially available separators having a thickness of 0.8 mm made of resin impregnated cellulose pulp sheet.

Table I

| No. | Capping of -OH Reaction time (hr) | Degree of capping (% by mole) | Capacity (A.hr) Before repeated discharge-charge 1 =¹ | 8 =¹ | After repeated discharge-charge =² 200 | 400 | 600 |
|---|---|---|---|---|---|---|---|
| 1–1 | — | 0 | 3.94 | 1.80 | 3.82 | 3.50 | 0 |
| 1–2 | 0.5 | 51 | 3.93 | 1.79 | 3.85 | 3.73 | 2.01 |
| 1–3 | 1 | 62 | 3.93 | 1.78 | 3.87 | 3.79 | 3.54 |
| 1–4 | 2 | 73 | 3.92 | 1.77 | 3.89 | 3.82 | 3.71 |
| 1–5 | 3 | 81 | 3.90 | 1.75 | 3.89 | 3.85 | 3.80 |
| 1–6 =³ | — | — | 3.10 | 1.31 | 2.75 | 0 | 0 |

Note:
=¹ Amperage at discharge
=² At amperage of 1 A at discharge 16  =³ Commercially available resin impregnated cellulose separator

EXAMPLE 2

The novolak resin similar to that used in Example 1 was extruded in a manner similar to Example 1 to prepare fibers of various diameters as shown in Table II. The fibers were immersed in a bath of 500 ml of concentrated hydrochloric acid and 500 ml of an aqueous solution of formaldehyde at room temperature. Then, the bath was heated to 98°C over a period of 4 hours and maintained at the temperature to effect curing. The degree of hardening was found to be 10 to 16 percent. The cured fibers were treated with a mixture of 300 g of dimethylacetamide, 100 g of terephthalyl dichloride and 20 g of p-toluenesulfonic acid at a temperature of 130°C for 3.5 hours to effect esterification of the phenolic hydroxyl groups.

A sheet of 0.2 mm thickness was prepared from the fibers, so treated, in the same manner as that of Example 1 except that a styrene-butadiene rubber was used instead of the resol resin. A lead-acid storage battery having a capacity of 4 A.hr at 10 hours' rate was constructed in a manner similar to that of Example 1. Capacity of the storage battery and tensile strength and electrical resistance of the separator were determined. Results are shown in Table II.

Table II

| No. | Characteristics of separator | | | Capacity (A.hr) | | | |
|---|---|---|---|---|---|---|---|
| | Diameter of fibers (micron) | Tensile strength (kg/mm²) | Electrical resistance (Ω/cm²) | Before repeated discharge-charge 1 =¹ | 8 =¹ | After repeated discharge-charge =² 200 | 400 |
| 2–1 | 7–8 | 0.18 | 0.05 | 3.80 | 1.73 | 3.68 | 2.03 |
| 2–2 | 4–5 | 0.20 | 0.05 | 3.82 | 1.70 | 3.77 | 3.70 |
| 2–3 | 1–2 | 0.22 | 0.06 | 3.82 | 1.67 | 3.79 | 3.71 |

Note:
=¹ Amperage at discharge
=² At amperage of 1 A at discharge

EXAMPLE 3

Phenolformaldehyde resin fibers having a length of 0.1 to 2 mm and a diameter of 0.1 to 2 microns were prepared by extruding a novolak resin having a molecular weight of 850 and curing the extruded fibers, under conditons similar to those described in Example 1.

The phenolformaldehyde resin fibers were blended with polyethylene terephthalate fibers having a length of 5 mm and a diameter of 13 microns in the proportions listed in Table V. The blend of fibers was put into a bath of water containing 10 percent of resol resin, as a binder, 1 percent of hexamethylenetetramine 0.001 percent of nonionic surface active agent ("Noniorite AL-11", trade name, made by Kyoeisha Yushi Kagaku Kogyo K. K., Japan), and 10 percent of sap of hibiscus' root, followed by agitation to prepare a dispersion of the fibers having a concentration of 2 g/l. The dispersion was formed into a wet sheet on the 100 mesh wire net of a papermaking box while applying a light suction to the wet sheet. The wet sheet was air-dried and then heated at a temperature of 160°C for 2 minutes. The sheet so manufactured had a basis weight of 80 kg/m$^2$ and a thickness of 0.3 mm. Content of the resol resin in the sheet was 10 percent. Characteristics of the sheet are shown in Table III.

Table III

| No. | Composition (%) *1 PET | *2 PH | Binder | Electrical resistance ($\Omega$/cm$^2$) | Permeability | Oxidation resistance (Hr) | Tensile strength (kg/mm$^2$) |
|---|---|---|---|---|---|---|---|
| 5–1 | 90 | 0 | 10 | 0.035 | Permeable | more than 240 | 1.82 |
| 5–2 | 85 | 5 | 10 | 0.044 | slightly permeable | '' | 1.80 |
| 5–3 | 65 | 25 | 10 | 0.055 | no permeable | '' | 1.03 |
| 5–4 | 50 | 40 | 10 | 0.072 | '' | 200 | 0.85 |
| 5–5 | 35 | 55 | 10 | 0.10 | '' | 150 | 0.27 |
| 5–6 | 0 | 90 | 10 | 0.15 | '' | 85 | 0.09 |

Note:
*1 Polyethylene terephthalate fiber
*2 Phenolformaldehyde resin fiber

Using each of the above sheets as a separator, lead-acid storage batteries each having a capacity of 24 A.hr at 10 hours' rate were constructed in a manner such that each sheet was placed closely adherent to the position plate and a glass fiber mat of 0.5 mm thickness was placed between the sheet and the negative plate. The capacity at 3 hours' rate and the capacity before and after repeated 3.5 hours' discharge and 4 hours' charge were determined. Results are shown in Table IV.

Table IV

| No. | Capacity at 3 hours' rate | Before repeated discharge-charge | Capacity (A.hr) After repeated discharge-charge | | |
|---|---|---|---|---|---|
| | | | 200 | 400 | 600 |
| 5–1 | 20.2 | 23.8 | 0 | — | — |
| 5–2 | 21.3 | 24.2 | 23.7 | 21.1 | 19.7 |
| 5–3 | 21.5 | 24.4 | 23.9 | 22.6 | 21.5 |
| 5–4 | 21.5 | 24.5 | 23.9 | 22.4 | 21.0 |
| 5–5 | 19.8 | 24.0 | 23.4 | 16.5 | 0 |
| 5–6 | 19.3 | 23.9 | 14.7 | 0 | — |

EXAMPLE 4

From a mixture of 60 parts of polyvinyl chloride fiber having a diameter of 10 microns and the length listed in Table VII and 40 parts of phenolformaldehyde resin fibers similar to that used in Example 5, sheets were prepared in a manner similar to that in Example 5 except that the resol phenolformaldehyde resin and the hexamethylenetetramine were not added and the air-dried sheets were pressed at a pressure of 50 kg/cm$^2$ and a temperature of 60°C for 30 seconds. The resultant sheets had a basis weight of 70 g/m$^2$ and a thickness of 0.2 mm. Characteristics of the sheets are shown in Table V.

Table V

| No. | Length of PVC fibers (cm) =1 | Electrical resistance ($\Omega$/cm$^2$) | Permeability | Tensile strength (kg/mm$^2$) |
|---|---|---|---|---|
| 6–1 | 0.05 | 0.17 | no permeable | 0.12 |
| 6–2 | 0.2 | 0.11 | '' | 0.92 |
| 6–3 | 0.5 | 0.069 | '' | 1.33 |
| 6–4 | 1.5 | 0.070 | '' | 1.85 |
| 6–5 | 3.0 | 0.067 | '' | 2.11 |
| 6–6 | 4.0 | 0.053 | permeable | 1.79 |

Note:
=1 Polyvinyl chloride fibers

Using the sheet of No. 6-3 as a separator two lead-acid storage batteries each having a standard capacity of 4 A.hr at 10 hours' rate were constructed. One had a structure such that the sheet was placed closely adherent to the positive plate and a glass fiber and of 0.5 mm thickness was placed between the sheet and the negative plate. Such structure is herein called as adherent type. The other had a structure such that the glass fiber mat was placed adherent to the positive plate and the sheet was placed between the glass fiber mat and the negative plate. Such structure is herein called as non-adherent type.

For a comparison purpose, two lead-acid storage batteries were constructed in a manner similar to the above from a commercially available phenolformaldehyde-impregnated cellulose pulp sheet (No. 6-7).

The capacity was determined before and after repeated 3.5 hours' discharge and 4 hours' charge. Results are shown in Table VI.

Table VI

| No. | Structure | Capacity (A.hr) | | | |
|---|---|---|---|---|---|
| | | Before repeated discharge-charge | After repeated discharge-charge | | |
| | | | 200 | 400 | 600 |
| 6-3 | Adherent | 3.72 | 3.68 | 3.61 | 3.52 |
| | Non-adherent | 3.95 | 3.71 | 3.32 | 2.63 |
| 6-7 | Adherent | 3.47 | 3.25 | 0 | 0 |
| | Non-adherent | 3.82 | 3.57 | 2.13 | 0 |

EXAMPLE 5

From a mixture of polyacrylonitrile fibers having a diameter of 10 microns and a length of 0.5 cm and phenolformaldehyde resin fibers similar to those used in Example 5, the ratio of the former and latter fibers was 11:7 by weight, sheets were prepared in a manner similar to that in Example 5 except that styrene-butadiene copolymer was used as a binder instead of the resol resin at various amounts.

Using each of the sheets as a separator, lead-acid storage batteries each having a capacity of 4 A.hr at 10 hours' rate were constructed in a manner similar to that in Example 5. The capacity when discharged at an amperage of 8 A and the voltage 5 minutes' after initiation of the discharge were determined. Results are shown in Table VII.

Table VII

| No. | Composition (%) | | | Capacity (A.hr) | Voltage |
|---|---|---|---|---|---|
| | PAN =1 | PF | Binder | | |
| 7-1 | 55 | 35 | 10 | 1.53 | 1.87 |
| 7-2 | 49 | 31 | 20 | 1.40 | 1.82 |
| 7-3 | 43 | 27 | 30 | 1.19 | 1.78 |

Note:
=1 Polyacrylonitrile fibers

EXAMPLE 6

Phenolformaldehyde resin fibers having a length of 0.1 to 5 mm and a diameter of 0.1 – 3 microns were prepared by extruding a novolak resin having a molecular weight of 850 and curing the extruded fibers, under conditions similar to those described in Example 1. The fibers was put into a bath of water containing 15 percent of resol phenolformaldehyde resin as a binder, 0.001 percent of nonionic surface active agent ("Noniolite AL-11", trade name, made by Kyoeisha Yushi Kagaku Kogyo K. K., Japan), and 5 percent of polyvinyl alcohol, followed by agitation to prepare a dispersion of the fibers having a concentration of 2 g/l. The dispersion was made to be formed into a wet sheet on the 100 mesh wire net of a papermaking box. The wet sheet was air-dried and then heated at a temperature of 160°C for 2 minutes. The sheet so manufactured had a basis weight of 80 g/m² and a thickness of 0.3 mm.

Then, the sheet was coated by a brush with a 3 percent solution of polyvinyl chloride having a polymerization degree of 1,300 in tetrahydrofuran, and dried. The amount of the polyvinyl chloride deposited was 3.4 percent based on the weight of the sheet. Similarly, several sheets having different amounts of polyvinyl chloride coated thereon were prepared. Characteristics of the sheets are shown in Table VI.

Table VIII

| No. | Amount of PVC resin deposited | Electrical resistance ($\Omega/cm^2$) | Oxidation resistance (Hr) | Tensile strength (kg/mm²) |
|---|---|---|---|---|
| 8-1 | 1.5 | 0.031 | 70 | 0.08 |
| 8-2 | 3.4 | 0.035 | 150 | 0.132 |
| 8-3 | 5.2 | 0.040 | 270 | 0.25 |
| 8-4 | 8.7 | 0.072 | more than 300 | 0.38 |
| 8-5 | 14.6 | 0.098 | " | 0.75 |
| 8-6 | 24.7 | 0.33 | " | 1.06 |
| 8-7 | 30.1 | 1.48 | " | 1.31 |

Using the above sheets as separator, lead-acid storage batteries each having a standard capacity of 24 A.hr at 10 hours' rate were constructed. For a comparison purpose, two lead-acid storage batteries were similarly constructed from a commercially available separator (No. 8-8) made by sintering finely divided polyvinyl chloride.

The capacity was determined before and after repeated 3.5 hours' discharge and 4 hours' charge. Results are shown in Table IX.

Table IX

| No. | Structure | Before repeated discharge-charge | Capacity (A.hr) After repeated discharge-charge) | | |
|---|---|---|---|---|---|
| | | | 200 | 400 | 600 |
| 8-1 | Adherent | 24.2 | 20.1 | 0 | — |
| 8-2 | Adherent | 24.2 | 22.3 | 21.1 | 19.8 |
| 8-3 | Adherent | 24.1 | 23.2 | 21.4 | 20.0 |
| 8-4 | Adherent | 23.9 | 23.8 | 22.0 | 20.4 |
| | Non-adherent | 24.5 | 23.6 | 20.1 | 18.7 |
| 8-5 | Adherent | 23.0 | 22.7 | 21.5 | 20.2 |
| 8-6 | Adherent | 22.2 | 21.8 | 20.8 | 19.7 |
| 8-7 | Adherent | 20.7 | 19.5 | 18.3 | 17.2 |
| 8-8 | Adherent | 22.8 | 21.2 | 0 | 0 |
| | Non-adherent | 24.1 | 22.5 | 12.3 | 0 |

EXAMPLE 7

From a mixture of polyethylene terephthalate fibers having a diameter of 10 microns and a length of 0.5 cm and phenolformaldehyde resin fibers similar to those used in Example 8, the ratio of the former and latter fibers was 3 : 5 by weight, a sheet was prepared in a manner similar to that in Example 8. The sheet had a basis weight of 60 g/m² and a thickness of 0.25 mm. Then, the sheet was dipped with a 10 percent aqueous emulsion of styrene-butadiene copolymer ("Nippol 4850" trade name, Nihon Zeon K. K.) and a suction was applied to the sheet to make the emulsion penetrate thereinto. The sheet was then heated at a temperature of 120°C for 30 minutes. The amount of the copolymer deposited was 9.8 percent based on the weight of the sheet. Characteristics of the sheet are shown in Table X.

Table X

| No. | Amount os SB copolymer deposited | Electrical resistance ($\Omega/cm^2$) | Oxidation resistance (Hr) | Tensile strength ($kg/mm^2$) |
| --- | --- | --- | --- | --- |
| 9–1 | 9.8 | 0.057 | more than 300 | 0.42 |
| 9–2 * | 0 | 0.028 | 70 | 0.25 |

Note:
* not impregnated with the styrene-butadiene copolymer

Using the above sheets as separator, lead-acid storage batteries of the adherent type each having a capacity of 24 A.hr at 10 hours' rate were constructed. The capacity was determined before and after repeated 3.5 hours' discharge and 4 hours' charge. Results are shown in Table XI.

Table XI

| No. | Before repeated discharge-charge | Capacity (A.hr) After repeated discharge-charge | | |
| --- | --- | --- | --- | --- |
| | | 200 | 400 | 600 |
| 9–1 | 24.0 | 23.2 | 22.6 | 21.9 |
| 9–2 | 24.5 | 19.8 | 0 | — |

What we claim is:

1. A paste-type lead-acid storage battery having porous separators placed between the alternate positive and negative plates in the cells thereof, characterized in that at least part of each separator, adhering closely to the surface of the positive plate, is composed of a sheet in the form of non-woven fabric of phenolformaldehyde resin fibers having an average diameter of less than 5 microns, said sheet being provided with a plurality of microporous openings of a size sufficiently small to prevent finely divided particles of the anode active material from passing therethrough.

2. A paste-type lead-acid storage battery according to claim 1 which has a structure such that said sheet is placed closely adherent to the surface of the positive plate and the negative plate is placed on the opposite side of said sheet.

3. A paste-type lead-acid storage battery according to claim 1 which has a structure such that said sheet is placed closely adherent to the surface of the positive material and a mat of glass fibers is placed between said sheet and the negative plate.

4. A paste-type lead-acid storage battery according to claim 1 wherein said phenolformaldehyde resin fibers have an average diameter of less than 3 microns and an average length of 0.1 to 1 mm.

5. A paste-type lead-acid storage battery according to claim 1 wherein said phenolformaldehyde resin fibers are prepared by melt-extruding a novolak-type phenolformaldehyde resin through an orifice into a non-oxidizing atmosphere while non-oxidizing gas is blown against the extruding filament.

6. A paste-type lead-acid storage battery according to claim 1 wherein said phenolformaldehyde resin fibers are those in which at least 60 percent by mole of the phenolic hydroxyl groups contained therein is capped by treating said phenolformaldehyde resin fibers with acid anhydride, acid halide, an alkylating agent or an epoxy group-containing compound.

7. A paste-type lead-acid storage battery having porous separators placed between the alternate positive and negative plates in the cells thereof, characterized in that at least part of each separator, adhering closely to the surface of the positive plate, is composed of a sheet of densely woven fabric or non-woven fabric of a blend comprising at least 5 percent by weight of phenolformaldehyde resin fibers having an average diameter of less than 5 microns and at most 95 percent by weight of other acid and oxidation resistant type fibers having an average diameter of less than 25 microns and an average length of 0.2 cm to 3 cm, said sheet being provided with a plurality of microporous openings of a size sufficiently small to prevent finely divided particles of the anode active material from passing therethrough.

8. A paste-type lead-acid storage battery according to claim 7 wherein said phenolformaldehyde resin fibers have an average diameter of less than 3 microns and an average length of 0.1 to 1 mm.

9. A paste-type lead-acid storage battery according to claim 7 wherein said phenolformaldehyde resin fibers are prepared by melt-extruding a novolak-type phenolformaldehyde resin through an orifice into a nox-oxidizing atmosphere while non-oxidizing gas is blown against the extruded filament.

10. A paste-type lead-acid storage battery according to claim 7 wherein said phenolformaldehyde resin fibers are those in which at least 60 percent by mole of the phenolic hydroxyl groups contained therein is capped by treating said phenolformeldehyde resin fibers with acid anhydride, acid halide, an alkylating agent or an epoxy group-containing compound.

11. A paste-type lead-acid storage battery according to claim 7 wherein said densely woven fabric or non-woven fabric is made of a blend comprising at least 50 percent by weight of phenolformaldehyde resin fibers having an average diameter of less than 5 microns and at most 50 percent by weight of other acid and oxidation resistant type fibers having average diameter of less than 25 microns and average length of 0.2 cm to 3 cm.

12. A paste-type lead-acid storage battery according to claim 7 wherein said other acid and oxidation resistant type fibers are selected from the group consisting of acrylonitrile polymer fibers, vinyl chloride polymer fibers, vinylidene chloride polymer fibers, polyester fibers, polyether fibers, polypropylene fibers and inorganic fibers.

13. A paste-type lead-acid storage battery according to claim 1 wherein said non-woven fabric is prepared from an aqueous dispersion of the phenolformaldehyde resin fibers, and contains less than 20 percent by weight, based on the weight of the non-woven fabric, of a resin binder resulting from the incorporation of the resin binder into the aqueous dispersion of said fibers.

14. A paste-type lead-acid storage battery according to claim 13 wherein said resin binder is selected from phenol resin, petroleum resin, urea resin, acrylic resin and styrenebutadiene copolymers.

15. A paste-type lead-acid storage battery according to claim 1 wherein said non-woven fabric is prepared from an aqueous dispersion of the phenolformaldehyde resin fibers, and contains less than 25 percent by weight, based on the weight of the non-woven fabric, of an acid and oxidation resistant type synthetic polymer resin incorporated therein by impregnating the non-woven fabric therewith.

16. A paste-type lead-acid storage battery according to claim 15 wherein said acid and oxidation resistant type synthetic polymer resin is selected from acrylonitrile polymers, vinyl chloride polymers, polyesters, olefin polymers and styrene-butadiene copolymers.

17. A paste-type lead-acid storage battery according to claim 7 wherein said fabric has a structure such that the phenolformaldehyde resin fibers having an average diameter of less than 5 microns are integrated with a base fabric of acid resistant type synthetic polymer fibers in a manner such that at least part of the lengths of the phenolformaldehyde resin fibers is embedded in the base fabric.

* * * * *

UNITED STATES PATENT OFFICE
CERTIFICATE OF CORRECTION

Patent No. 3,910,799     Dated  Octobrt 7, 1975

Inventor(s)  Ko Kondo, Takashi Ito and Koichiro Ohtomo

It is certified that error appears in the above-identified patent and that said Letters Patent are hereby corrected as shown below:

In Table VIII, under Tensile Strength ($kg/mm^2$), line 2, "0.132" should be --0.12--

Signed and Sealed this thirteenth Day of January 1976

[SEAL]

Attest:

RUTH C. MASON
*Attesting Officer*

C. MARSHALL DANN
*Commissioner of Patents and Trademarks*